United States Patent

[11] 3,625,158

| [72] | Inventors | Klaus Lorenz;<br>Horst Giessler; Friedrich Juergens,<br>Whylen/Baden, Germany; Marc Waelti,<br>Luzern, Switzerland; Adolf Mutter; Adolf<br>Steinbock, Whylen/Baden, Germany |
|---|---|---|
| [21] | Appl. No. | 859,356 |
| [22] | Filed | Sept. 19, 1969 |
| [45] | Patented | Dec. 7, 1971 |
| [73] | Assignees | Firma Rene Blaser Hebe-und<br>Foerderanlagen, Maschinenbou;<br>Translift Gesellschaft fuer Hebe-und<br>Foerderanlagen mbH. Germany |
| [32] | Priority | Nov. 11, 1968 |
| [33] | | Germany |
| [31] | | P 18 08 210.5 |

[54] TROLLEY FOR OVERHEAD MONORAIL CONVEYOR
5 Claims, 4 Drawing Figs.

[52] U.S. Cl..................................................... 104/93,
104/110, 105/150
[51] Int. Cl....................................................... B61b 3/00,
E01b 25/24
[50] Field of Search............................................ 104/89, 93,
106, 110; 105/148, 150, 152; 191/45, 49

[56] References Cited
UNITED STATES PATENTS

| 875,864 | 1/1908 | Stout.............................. | 105/148 |
|---|---|---|---|
| 689,064 | 12/1901 | Butler............................ | 104/148 |
| 1,811,270 | 6/1931 | Henderson..................... | 104/106 |
| 2,117,480 | 5/1938 | Harvey.......................... | 191/45 A |
| 3,200,768 | 8/1965 | Harrison........................ | 104/172 |
| 3,252,429 | 5/1966 | Atanasoff....................... | 105/150 |
| 3,345,471 | 10/1967 | Kilburg........................... | 191/45 |
| 3,457,876 | 7/1969 | Holden........................... | 105/148 |
| 2,538,998 | 1/1951 | Whitcroft....................... | 105/156 |
| 1,725,264 | 8/1929 | Garnett.......................... | 105/156 |

*Primary Examiner*—Arthur L. La Point
*Assistant Examiner*—D. W. Keen
*Attorney*—Otto John Munz

ABSTRACT: An overhead trolley system using a special-profile monorail structure with horizontal curve sections, where the trolley assembly consists of a drive unit and an idler unit, connected by a traverse. The two units have similar C-frames, a support and guide wheel on top, and lateral guide rollers at the bottom. The wheel of the drive unit is driven by a motor and worm gear, and the power is transmitted over a roller-supported collector from rail-mounted bus bars. The traverse includes a yoke and a runup switch.

Inventor:
KLAUS LORENZ, HORST GIESSLER,
FRIEDRICH JUERGENS, MARC WAELTI,
ADOLF STEINBOCK, ADOLF MUTTER,

BY
ATTORNEY

Inventor:
KLAUS LORENZ, HORST GIESSLER,
FRIEDRICH JUERGENS, MARC WAELTI,
ADOLF STEINBOCK, ADOLF MUTTER, Inventor:
KLAUS LORENZ, HORST GIESSLER,
FRIEDRICH JUERGENS, MARC WAELTI,
ADOLF STEINBOCK, ADOLF MUTTER, BY *Otto John Munz*
ATTORNEY

TROLLEY FOR OVERHEAD MONORAIL CONVEYOR

BACKGROUND OF THE INVENTION

1. Field of the Invention

The invention relates to trolley systems using overhead or trolley tracks structures having a single rail and articulated load-carrying units such as in power and free conveyors.

2. Description of the Prior Art

Trolleys of this kind may be composed, for example, of a drive unit providing the traction, and of an idler unit. The load to be carried may thereby be suspended on either the idler unit or the drive unit, or on the connecting tie between them by using a special load gondola, for example. The drive train of the trolleys mentioned consists in general of a frame or housing to which are mounted special wheels which in conjunction with a driven wheel, for example, provide the motion of the trolley.

SUMMARY OF THE INVENTION

The present invention has for its objective to propose a new trolley which, together with a specially designed rail profile, forms an overhead monorail conveyor which has important advantages over known conveyors. The advantages can be seen in particular in that no only is the trolley simplified, but it is also capable of moving through rail bends of very small radius without jamming.

The invention proposes to meet the above objective by suggesting a trolley for overhead monorail conveyors which comprises a drive unit providing traction and an idler unit coupled to it, and which is characterized in that the drive unit comprises a C-shaped frame which includes: in its upper leg the support bearings for a driven support and guide wheel whose shaft is driven over a worm gear by a motor in perpendicular alignment with it; in its center part a collector; and in its lower part a vertical pivot stud for the attachment of a horizontally pivotable traverse member, and that the idler unit likewise comprises a C-shaped frame which includes: in its upper leg the bearing support for a vertical freely rotatable support and guide wheel; and in its lower leg a similar vertical pivot stud for the horizontally pivotable attachment of the other extremity of the traverse member.

The trolley of the invention offers the important advantage that load-carrying and drive, respectively, require only a single support and guide wheel each, a driven one in the drive unit, and an idling one in the idler unit. A simple link between the two trolley units in the form of a horizontally rotatable traverse makes it possible to move the trolley of the invention through bends of a comparatively small radius. The fact that the C-shaped frames of both trolley units are similar permits standardization of production which in turn leads to a lowering in production costs of the trolley of the invention.

Lateral stabilization can be achieved by arranging a bracket in the middle part or in the lower third of both C-shaped frames, which bracket carries four guide rollers arranged symmetrically with respect to the trolley axis. These guide rollers assure complete vertical stabilization of the trolley through their contact with the lower flange of the conveyor rail. This represents a further advantage of the proposed trolley which thus comprises, together with the two trolley units, only two vertical support and guide wheels and only eight horizontal guide rollers.

An additional advantage of the invention is the arrangement of the bus bars directly on the rail, making for simplicity and minimial space requirements

BRIEF DESCRIPTION OF THE DRAWING

The invention will be explained more clearly, by way of the example of a preferred embodiment, as illustrated in the accompanying drawings, where.

DESCRIPTION OF THE PREFERRED EMBODIMENT

Figure 1:
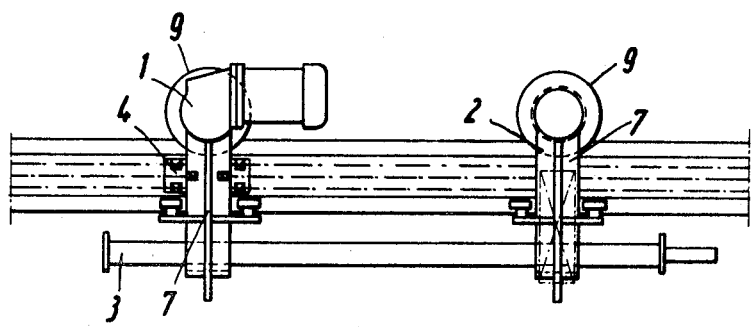
FIG. 1 shows the trolley of the invention in an elevated side view.
Figure 2:
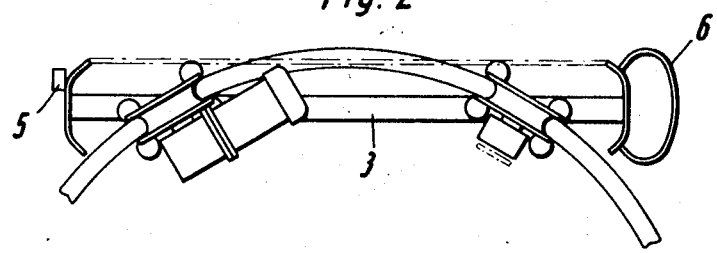
FIG. 2 is a plan view of the trolley of FIG. 1.

As can be seen from the FIGS. 1 and 2, the trolley consists essentially of the electric drive unit 1 and of the idler unit 2 which are linked together over a traverse member 3. The traverse member is pivotably attached to both trolley units, so that the trolley can run through small-radius bends in the conveyor rails, as can be seen from FIG. 2.

The electric drive unit includes a collector 4 which contacts bus bars supplying electric power for the drive and controls. The traverse member includes, at its front and rear extremities, a runup and switch 5 and carries a yoke 6 at its trailing end, the purpose of which is to connect or disconnect the end switch of a succeeding trolley. This makes it possible to align several trolleys end-to-end without special additional controls.

On startup of several trolleys in succession, the second one starts only a few seconds after startup of the first, followed after a similar delay by the third one, etc., thereby keeping the current surge on electrical equipment, such as transformers, to a minimum. In this case, the end switch is on the front end of the traverse member.

Figure 3:
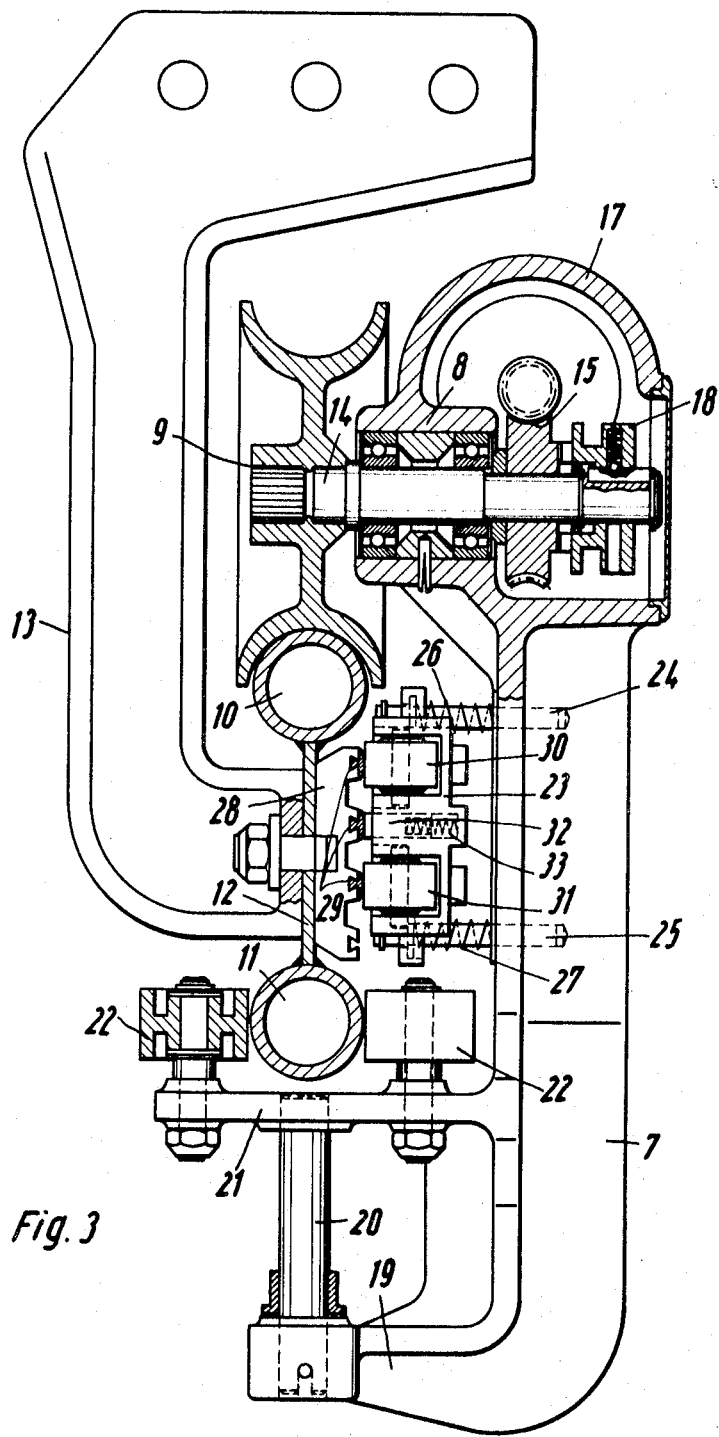
FIG. 3 is an enlarged cross-sectional view of the drive unit, together with the conveyor rail and the support frame.
Figure 4:
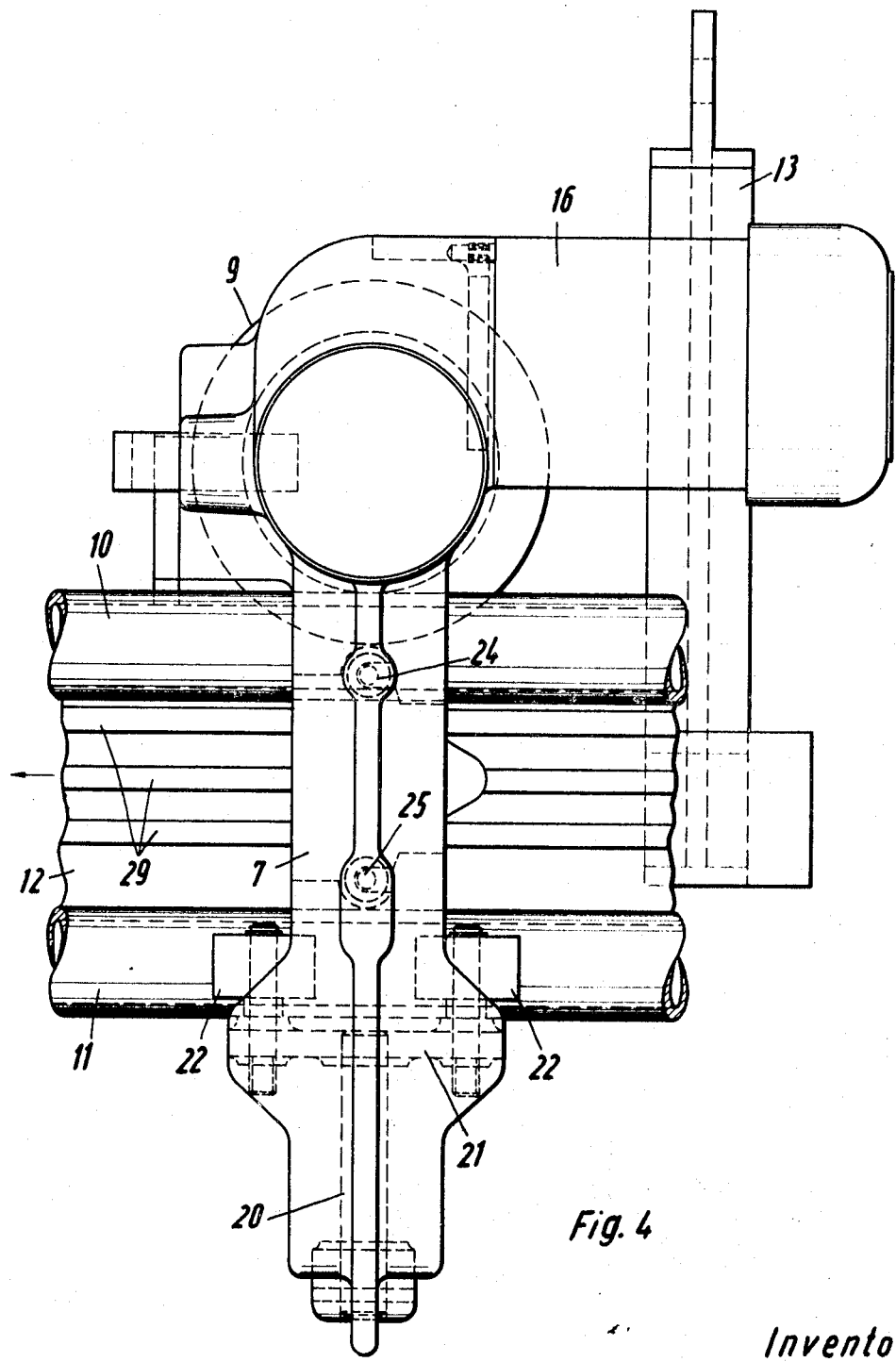
FIG. 4 is a side view of the drive unit of FIG. 3.

As can be seen more clearly from FIGS. 3 and 4, the electric drive unit consists of a C-shaped frame 7 which includes in its upper leg the support bearings for a support and guide wheel 9. The wheel 9 runs on the upper flange 10 of a conveyor rail which consists of two tubular profiles 10 and 11 and of a web 12. The conveyor rail is supported on support frames 13 which are part of an overhead structure or other kind of support. The wheel 9 has a peripheral profile matching the cross section of the upper flange 10 of the conveyor rail. The support wheel itself may be made of a suitable plastic material, for example, and it may be molded onto the shaft 14. The shaft 14 of the support and guide wheel is driven over a worm gear 15 by an electric motor 16 which is partially enclosed by the housing 17 and whose axis is perpendicular to the axis of shaft 14. The worm gear 15 includes a clutch 18 which can be connected to a fork-shaped clutch lever (not shown) which extends to the outside of the housing. This makes it possible to stop the trolley at any point by operating the clutch lever thereby stopping the support wheel, should an emergency or operational procedure require it.

In the lower leg 19 of the C-shaped frame 7 is mounted a pivot stud 20 which serves as a pivoting link for the traverse member 3, as shown in the FIGS. 1 and 2.

The center part of the C-shaped frame 7 includes a bracket 21 carrying four guide rollers 22 arranged symmetrically with respect to the trolley axis. The bracket 21 also holds the upper end of the pivot pin 20. The horizontal guide rollers contact the lower flange 11 of the conveyor rail on opposite sides, thereby assuring the stability of the trolley unit in the vertical axis. During motion the trolley is held in parallel alignment with the conveyor rail, as the horizontal guide rollers oppose any lateral forces. They are spaced in the direction of motion in such a way that they can run through a bend having a radius as small as 20 inches.

The center part of the C-shaped frame 7 also carries a collector which may have multiple conductors. This collector includes essentially a collector housing 23 mounted on two pins 24 and 25 which are set in the center part of the C-shaped frame. The pins also carry two compression springs 26 and 27 which are urge the housing against the bus bars 29, mounted on insulator blocks 28. The collector housing carries rollers 30 and 31 which roll directly on the bus bars 29, thereby maintaining a constant distance between the collector and the bus bars. Maintaining this constant distance eliminates the previously observed excessive motion of the carbon brushes inside their guide slots, a condition which may cause connectors to break and brushes to wear down. The spring 26 and 27 urge the collector against the bus bars and the rollers 30 and 41 are thus always in forcible contact with them.

The collector brushes 32 which are guided inside the collector housing are independently spring loaded by compression springs 33, thereby forming contact with the bus bars which may be of copper or steel, for example. The rollers 30 and 31 are held inside the collector by pins which are held against the bottom of open slots. This permits quick replacement of the rollers.

The idler unit 2 which is linked to the drive unit 1 over the traverse member 3 and the bolts 20 is of essentially identical design, except that the idler unit is assembled without a motor, clutch, and drive gear, and without a collector. The support and guide wheel 9 rotates freely in the upper leg 8 of the C-shaped frame 7, trailing behind the driven support and guide wheel 9 during the forward motion, and preceding it during the backward motion. The vertical stability of the idler unit is likewise assured by a set of horizontal guide rollers 22 which contact the lower flange 11 of the conveyor rail.

What is claimed is:

1. An overhead trolley system comprising in combination:
   a. a rigid rail structure including rail support means to support said rail structure at a distance from the ground;
   b. electric power supply means mounted on said rail structure;
   c. a trolley assembly movably supported by said rail structure for forward and backward motion thereon, said trolley assembly including
   d. a drive unit being supported and independently guided by said rail structure;
   e. an idler unit being likewise supported and independently guided by said rail structure; and
   f. connecting means to link pivotally said idler unit to said drive unit for motion therewith, so that it is capable of pulling said idler unit during forward motion and pushing it during backward motion; and wherein said connecting means includes:
      a traverse member having two pivot pints spaced from one another;
      means to pivotably attach said traverse member at said pivot points to said pivot studs of the drive unit and idler unit, respectively;
      a yoke means on one extremity of said traverse member; and
      switching means on the other extremity thereof to control the motion of said trolley assembly upon approach and withdrawal of said trolley assembly with respect to the yoke means of an adjacent trolley assembly present on the same rail structure with respect to a stationary object.

2. An overhead trolley system as claimed in claim 1, further comprising
   an electric motor;
   a vertically arranged rail structure, having upper and lower circular tubular members and a central web;
   a power collecting means, comprising at least two electric conductor rails vertically and insulatingly mounted on said central web;
   a collector body, comprising electric current collector rolls mounted movingly in a horizontal direction on said collector body;
   guide pins and independent spring means resiliently holding said current collector rolls each individually against said electric conductor rails;
   whereby said electric current collector rolls supply electric current to said motor of said overhead trolley system.

3. An overhead trolley system as claimed in claim 1, wherein said drive unit and said idler unit each comprises
   a main frame of a generally C-shaped outline including an upper leg, a lower leg and a center portion,
   a shaft journaled in said upper leg and extending horizontally at right angles to said upper rail profile, said support wheel being fixedly mounted on said shaft, so as to transmit vertical load forces from said frame to said rail structure,
   at least two horizontal guide rollers rotatably journaled on and supported by said lower leg of the frame, said guide rollers being located on opposite sides of said lower rail profile.

4. An overhead trolley system as claimed in claim 3, wherein said drive unit and said idler unit each comprises
   four horizontal guide rollers rotatably journaled on and supported by said lower leg of said frame, said guide rollers being located in two pairs on opposite sides of said lower rail profile and so that the axis of said shaft and support wheel lies between said two pairs of guide rollers, when seen in a plan view projection;
   said drive unit and said idler unit each further comprising
   a vertical pivot stud mounted in said lower leg for linking said connecting means to said drive unit and to said idler unit, respectively.

5. An overhead trolley system as claimed in claim 3, wherein said drive unit further comprises
   a worm gear drive for the transmission of motive power from said electric motor to said shaft and
   clutch means to establish a selectively controllable driving connection between said worm gear drive and shaft.

* * * * *